Oct. 28, 1969   J. L. RUSSELL   3,475,500
RECOVERY OF BORON COMPOUNDS IN THE OXIDATION OF HYDROCARBONS
Filed May 31, 1966
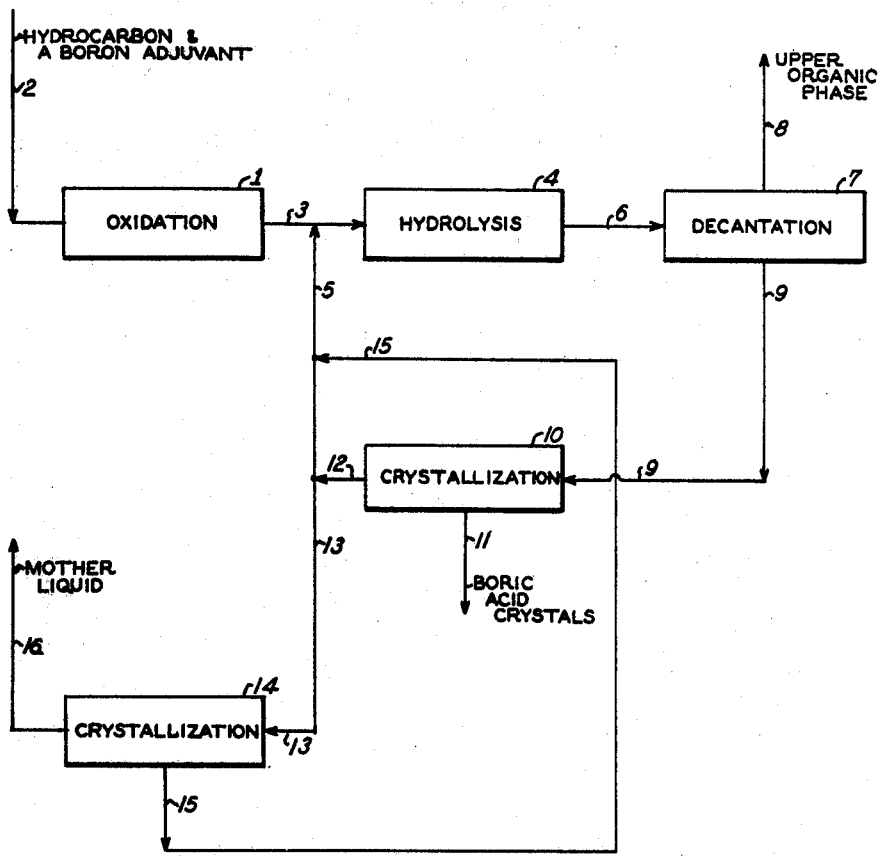
INVENTOR
JOSEPH L. RUSSELL
BY
William C. Long
ATTORNEY

United States Patent Office 3,475,500
Patented Oct. 28, 1969

3,475,500
RECOVERY OF BORON COMPOUNDS IN THE OXIDATION OF HYDROCARBONS
Joseph Lee Russell, Ridgewood, N.J., assignor to Halcon International, Inc., a corporation of Delaware
Filed May 31, 1966, Ser. No. 554,195
Int. Cl. C07c 27/12; C01b 35/00; B01j 11/02
U.S. Cl. 260—631                        2 Claims

ABSTRACT OF THE DISCLOSURE

This invention relates to the recovery of boron compounds in the oxidation of hydrocarbons wherein the boron compounds are effectively recovered by obtaining several crops of boron compounds and returning the last crop to the hydrolysis zone.

---

This invention relates to the oxidation of hydrocarbons with molecular oxygen-containing gases in the presence of boron compounds. More particularly it relates to an improvement in such oxidation processes whereby the boron compounds may be efficiently recovered and reused.

It is well known that hydrocarbons can be directly oxidized with molecular oxygen containing gases to produce oxygenated organic derivatives of great commercial importance. It is also known that boron compounds which esterify with alcohols formed during the oxidation are advantageously employed in such oxidations as adjuvants to provide improved selectivity in the conversion of such hydrocarbons to the desired products, most commonly the monofunctional alcohol and ketone derivatives of the hydrocarbon being oxidized. Such processes are disclosed, for example, by Winnick, U.S. Patent No. 3,243,449.

In the commercial practice of such processes, it is readily apparent that, for the process to be economically attractive, the boron compounds must be recovered and recycled to the oxidation. However, this presents problems to the art. Conventional recovery techniques are efficient in that substanitally all of the boron compounds present in the oxidation reactor effluent can be recovered but, when such recovery techniques are employed and the boron compounds are recovered and recycled to the oxidation, the selectivity of the oxidation reaction to the desired products decreases rapidly. Indeed, so rapid is this decline in selectivity that after as few as three of four such recycles, the selectivity becomes too low for continuance of the oxidation to be economic.

It has been found that this decline in selectivity is due to the build-up of impurities which are preferentially associated with the boron compounds. These impurities are difficult to separate completely from the boron compounds and, even a few percent of such impurities are sufficient to seriously impair the efficiency of the oxidation. The nature of these impurities has not been fully elucidated, but in the case of cyclohexane oxidation, hydroxycaproic acid, succinic, adipic and glutaric acids are among the impurities deleterious to the oxidation process.

As a palliative for this problem, as disclosed in copending application Ser. No. 205,186, filed June 26, 1962, now abandoned, it is possible to purge a portion of the boron compounds from the recycle and to add fresh boron compound as make-up in order to prevent impurities build up. But, this causes excessive losses of the boron compounds and substantially increases the expense of operation of the process. Moreover, any attempt to reduce the amount of boron compound purged from the system results in greatly lowered oxidation reaction selectivity. Thus, there is a two-fold problem; impurities must be removed from the system and this must be done without substantial loss of the boron catalysts.

In accordance with my invention, I have found a process for processing the effluent from the oxidation reaction whereby the deleterious impurities can be reduced to a level sufficient to permit continued re-use of the boron material in the oxidation while maintaining oxidation selectivity at a level approachng that achieved with fresh boron compound. At the same time the amount of boron compound purged from the system in accordance with my invention is as readily applicable to a continuous oxidation process as it is to a batch process.

To place my invention in its proper context, it is first necessary to describe the oxidation reaction. A hydrocarbon in liquid phase together with a boron compound such as meta boric acid is charged to a reactor and contacted with a molecular oxygen containing gas at reaction conditions until the desired conversion is obtained. Usually from 5 to 15% of the hydrocarbon is converted per pass, though higher or lower conversions can be obtained. Typical oxidation temperatures are in the range from about 150° C. to about 200° C. Typical pressures are from about atmospheric to 1000 p.s.i.g., depending, for example, on the hydrocarbon, preferably 100 p.s.i.g. to about 200 p.s.i.g. The preferred boron compounds employed in such oxidations are boric acids (ortho and meta boric acids) boric acid esters (such as the ester of meta boric acid with the mono-alcohol derivative of the hydrocarbon being oxidized, eg., cyclododecanyl meta borate when cyclododecane is the hydrocarbon being oxidized) and boric acid anhydrides (e.g., $B_2O_3$ and $B_4O_5$). Mixtures of these boron catalyst compounds (as they are referred to hereinafter) can also be employed.

Suitable hydrocarbon feeds to the oxidation reaction are those saturated hydrocarbons having from 4 to and including 20 carbon atoms per molecule. This includes mixtures of such hydrocarbons. Thus, aliphatic and alicyclic hydrocarbons such as, for example, cyclohexane, methyl cyclohexane, cycloheptane, cyclooctane, dimethyl cyclohexanes, n-pentane, n-hexane methyl pentanes, methyl butane, cyclododecane, eicosane, $C_{12}$ to $C_{14'}$ petroleum naphtha, $C_{14}$ to $C_{18'}$ petroleum naphthas, and the like. In the context of this application it is not necessary that the feed be entirely free of unsaturated materials, such as cyclohexene, so long as the feed consists essentially of saturated hydrocarbons, i.e., more than about 95% (mol basis) saturated. Similarly, small amounts of sulfur and nitrogen containing compounds, present as impurities, can also be present in the hydrocarbon feed.

At the present time the most widely practiced embodiment of the hydrocarbon oxidation reaction is the oxidation of cyclohexane to a mixture of cyclohexanol and cyclohexanone; hence, the process of the invention will be described using cyclohexane oxidation as an illustrative embodiment, it being understood that the invention is not limited to this feed but is broadly applicable to any of the feeds referred to hereinabove.

During the oxidation of the hydrocarbon (cyclohexane or any of the other hydrocarbons referred to hereinabove) the majority of the hydrocarbon is converted to a borate ester of the corresponding monofunctional alcohol and to ketone. It is believed that an alcohol is formed during the oxidation which then esterifies with the boron adjuvant compound to form a borate ester, e.g., cyclohexyl borate. An alternate route could be for cyclohexyl hydroperoxide to react with the boron compound to give a peroxyborate which then reacts to form cyclohexyl borate. Thus, when cyclohexane is oxidized the reactor effluent contains, primarily unreacted cyclohexane, cyclohexyl borate, cyclohexanone, cyclohexyl peroxy borate or cyclohexyl hydroperoxide, and small amounts of undesirable by-products, deleterious to the later recovery and re-use of the boron compound. Such mixtures of products and unreacted feedstock are hereinafter referred to in this specification and in the appended claims as borate ester-containing hydrocarbon oxidation mixtures.

The borate ester containing hydrocarbon oxidation mixture is then hydrolyzed, thereby converting the borate ester to the free alcohol and ortho boric acid. The main oxygenated products are recovered as product and the boric acid is recovered for recycle to the hydrocarbon oxidation. My invention *resides* in the *manner* of recovery and in the treatment of the boric acid obtained in this hydrolysis.

The borate ester-containing hydrocarbon oxidation mixture is hydrolyzed by admixing it with an aqueous stream in a hydrolysis reactor. The resultant admixture is withdrawn from the reactor after the hydrolysis is substantially complete and it is separated into an aqueous phase and an oxygenated organics phase containing the desired oxygenated products, viz., cyclohexanol and cyclohexanone, together with unreacted cyclohexane. The boric acid is separated with the aqueous phase, since generally water in excess of the stoichiometric amount theoreticaly required for hydrolysis is employed. If sufficient water is used, all of the boric acid can be dissolved in the aqueous phase; otherwise, a portion thereof precipitates as a solid. Also present in this aqueous phase are impurities which if returned to the oxidation zone interfere with the oxidation reaction as above mentioned.

In accordance with my invention, this aqueous phase is treated to recover a first crop of solid boric acid, as by, for example, crystallization followed by centrifugation of filtration. This first crystallization is carried out such that the recovered boric acid is, preferably after suitable washing as with water, of a purity such that the boric acid can be recycled to the oxidation step. That is, the total feed to the oxidation should not contain more than 2.5% by weight of adipic acid, glutaric acid and hydroxy caproic acid based on total dry boric acid. The mother liquor water phase left after the first crop of solid boric acid is recovered contains substantial amounts of boric acid and is concentrated in organic impurities. The aqueous boric acid-containing mother-liquor stream is divided into two portions, the larger portion is returned to the hydrolysis reactor as the aqueous hydrolysis stream, make-up water being added as required. The balance of the mother-liquor from the first boric acid crystallization is removed from the process as a purge stream. It is essential in practice of the present invention that this purge stream be worked up for the optimum recovery of boric acid values.

In accordance with the present invention, the aqueous purge stream is subjected to a second crystallization treatment. Conveniently this stream is concentrated as by evaporation of water and cooled in order to crystallize at least about 70% of the ortho boric acid contained therein. Necessarily there are co-precipitating with the boric acid values of the impurities which are contained in the purge stream. In fact, with adequately high recovery of the boric acid the amount of impurities co-precipitating is such as to preclude the direct recycle and use of the boric acid in the oxidation reaction.

In accordance with my invention the recovered boric acid crystals from the second crystallization are redissolved in water and the resulting solution is added to the hydrolysis mother-liquor from the first crystallization which is returned to the hydrolysis reaction. It has been found that a considerably higher impurities content based on boric acid can be tolerated in the hydrolysis loop than can be tolerated in the oxidation zone. Accordingly, the present described procedure represents a method whereby maximum concentration of impurities in the discard stream can be achieved while at the same time maximum recovery of valuable boric acid is also achieved. The boric acid crystals recovered in the second crystallization in the purge stream are contaminated to a sufficient degree that they cannot be directly recycled to the oxidation zone but they can be recycled in the hydrolysis loop.

Suitable practice of the present invention is described in connection with the embodiment schematically illustrated in the accompanying drawing. Referring to the drawing, hydrocarbon such as cyclohexane together with a suitable boron adjuvant such as meta boric acid is introduced into oxidation zone 1 by means of line 2 and therein is subjected to oxidation by contact with molecular oxygen containing gas. The oxidation reaction mixture comprising borate ester in hydrocarbon is removed from zone 1 by means of line 3 and passes hydrolysis zone 4 wherein the reaction mixture is contacted with an hydrolysis stream introduced by means of line 5. In zone 4 the borate ester is hydrolyzed to the alcohol and ortho boric acid. The hydrolysis mixture is removed by means of line 6 and passes to decantation zone 7 wherein the mixture is separated into an uper organic phase containing the unreacted hydrocarbon together with the alcohol and ketone products of oxidation and a lower aqueous boric acid phase. The upper phase is removed by means of line 8 and is treated in accordance with known procedures for the recovery of the valuable alcohol and ketone products.

The lower aqueous boric phase from zone 7 passes via line 9 to crystallization 10 wherein by appropriate crystallization procedures such evaporative crystallization boric acid is crystallized from the aqueous solution. The boric acid crystals are separated by means of line 11 and can conveniently be recycled after appropriate dehydration to the oxidation zone. The aqueous boric acid mother liquor solution passes from zone 10 by means of lines 12 and 5 back to the hydrolysis zone. However, in order to avoid an impurities build-up a purge stream passes via lines 12 and 13 to a second crystallization zone 14. In this zone 14 preferably the solution is first concentrated by an evaporation of water and some organic products. The concentrated solution is cooled and a high percentage of the boric acid contained therein is crystallized. Coprecipitating with the boric acid are significant quantities of impurities. In accordance with the present invention this crystallized boric acid is removed via line 15 and recycled, preferably after first being redissolved in make-up water by means of lines 15 and 5 back to the hydrolysis zone 4. The mother liquor from crystallization zone 14 is purged from the system via line 16.

The process is further described in the following example which is intended only as illustrative and not as limiting of the invention. Unless otherwise indicated, all parts and percentages are by weight.

EXAMPLE

Six hundred thirty-five point 5 parts of a borate ester-containing hydrocarbon oxidation mixture, prepared by the oxidation of cyclohexane in the presence of meta boric acid, are charged continuously to a hydrolysis reactor. This feed contains approximately 86% of unreacted cyclohexane. One percent of cyclohexanone, and 10.8% of cyclohexyl borate with the balance comprising impurities with a trace (<0.1%) of unreacted meta boric acid. Also charged continuously to the hydrolysis reactor are 279 parts of an aqueous boric acid containing stream and 0.6 part of ortho boric acid (88.8%) cake recovered from the hydrolysis reactor effluent in a manner described subsequently. The aqueous boric acid-containing stream has the following composition: water 82.6%, cyclohexanol plus cyclohexanone 0.9%, ortho boric acid 6.4%, with the balance consisting largely of other organics, including undesired impurities. The hydrolysis reaction is carried out at 80° C. until essentially all the ester in the borate ester-containing hydrocarbon oxidation mixture is hydrolyzed which is accomplished with an average residence time in the hydrolysis reactor of ½ to ¾ of an hour.

The effluent from the hydrolysis reactor, containing substantially no borate ester is decanted to produce an oxygenated organics stream (624.9 parts) containing the desired cyclohexanol and cyclohexanone products together with unreacted cyclohexane. The aqueous phase (286.6 parts) contains substantially all the boric acid in solution. The aqueous phase is then cooled to 43° C. while under vacuum (total pressure=60 mm. Hg) and a significant portion of the boric acid is thereby crystallized from solution and recovered by centrifugation. In this manner the aqueous phase is separated into a first crop of solid boric acid (33.6 parts) in the form of a cake in the centrifuge and a mother liquor stream (89.5 parts). The first crop boric acid cake is washed with a 0.5 part of water per part of cake and removed from the centrifuge. On analysis, it is found to have less than 0.5% by weight of impurities and is suitable for recycle to the hydrocarbon oxidation reaction.

The mother liquor phase is divided into two streams. The larger stream (110 parts) is diluted with water and returned to the hydrolysis reactor. The smaller stream (10.2 parts) is withdrawn as a purge and is processed as follows:

The purge stream contains by weight 75.4% water, about 7.5% of ortho boric acid. The balance consists of about 2% cyclohexanol plus cyclohexanone together with about 15% of other organic materials including undesirable byproducts. This stream is first concentrated by evaporation of water to form a mixture containing 57.8% water. The water removed in this manner contains substantial amounts of cyclohexanol and cyclohexanone which can be recovered, if desired. The now concentrated purge stream is then fed to a crystallizer maintained at 43° C. and 60 mm. Hg wherein a slurry of 21.6% boric acid crystals in mother liquor is formed. This slurry is then centrifuged to recover a second crop of solid boric acid in the form of a cake in the centrifuge. This cake is washed with 0.25 part of water per part of cake to reduce the impurities contained therewith from 12 to 6% by weight. This cake which contains large amounts of adipic and hydroxy caproic cannot be returned directly to the oxidizer. To do so would give sharply depressed selectivities. Thus, the cake, after washing, is redissolved in make-up water and returned to the hydrolysis reactor. The remaining purge (mother liquor) amounting to only 2.8 parts and containing less than 0.5% of the boric acid equivalents present in the hydrolysis reactor feed is discarded.

What is claimed is:
1. A method which comprises:
(A) hydrolyzing a borate ester-containing hydrocarbon oxidation mixture with an aqueous boric acid containing hydrolyzing stream in a hydrolysis zone, said oxidation mixture being prepared by reaction between a molecular oxygen containing gas and a saturated hydrocarbon liquid in the presence of a boron compound, said saturated hydrocarbon liquid consisting of molecules having from 4 to and including 20 carbon atoms each,
(B) withdrawing the resultant admixture from the hydrolysis zone,
(C) separating the admixture into:
(1) an oxygenated organics stream; and
(2) an aqueous boric acid-containing stream,
(D) separating a first crop of boric acid crystals from said aqueous boric acid-containing stream leaving an aqueous boric acid mother liquor,
(E) withdrawing a purge stream from the said aqueous boric acid-containing mother liquor, and returning the remaining aqueous boric acid mother liquor to the hydrolysis zone,
(F) recovering a second crop of solid boric acid from said purge stream, and
(G) returning said second crop of solid boric acid to the hydrolysis zone.

2. The method of claim 1 wherein said hydrocarbon is cyclohexane.

References Cited

UNITED STATES PATENTS 3,324,186  6/1967  Olenberg _____ 260—631

FOREIGN PATENTS 969,148  10/1964  Great Britain.

OTHER REFERENCES

Hougen et al.: Chemical Process Principles, second edition, Wiley & Sons, N.Y. (1954), p. 222.

LEON ZITVER, Primary Examiner

M. W. GLYNN, Assistant Examiner

U.S. Cl. X.R.

260—586, 617